March 25, 1958  R. L. HOLLOWAY  2,827,779
TORQUE COUPLING
Filed Oct. 26, 1954

INVENTOR.
ROBERT L. HOLLOWAY
BY
Wentworth R. Clapham
Attorney

United States Patent Office 2,827,779
Patented Mar. 25, 1958

2,827,779

TORQUE COUPLING

Robert L. Holloway, Snyder, N. Y.

Application October 26, 1954, Serial No. 464,691

7 Claims. (Cl. 64—30)

This invention relates to torque couplings, and more particularly to a simple torque control coupling of very high accuracy, which is readily adjustable to any desired torque within a wide range.

Many attempts have been made in the art to provide torque couplings which would make it possible to accomplish accurate and consistent application of torques. These attempts have proved either unsatisfactory or impractical because of size, complexity, and cost. The present invention solves these problems because a torque control coupling made in accordance with the invention is not only simple in construction, but also is highly accurate, and can be adjusted to any desired torque within a wide range according to the size of coupling, and the purpose for which it is to be used.

An example of the markedly improved results obtained by the use of a torque control coupling embodying the invention is found in the bottling industry. It is the usual practice to place a quantity of screw type bottle caps in a hopper from which they are fed in succession, picked up and applied to the tops of bottles. It is highly desirable and required in some cases that the torque required to remove a cap be held within relatively close limits. Considerable variations unavoidably exist in the accuracy and finish of the threads on both the caps and tops of bottles, and in the resiliency of gaskets and the like, and also in the height of bottles. Removal torque is established indirectly by the cap applying operation, or application torque when the cap is screwed upon a bottle top. Thus it is readily apparent that application torque must be controlled with extreme accuracy in order not to aggravate the inherent inaccuracies of the process. The present invention makes it possible to meet all requirements for accurate capping, and, therefore, results in advantages heretofore unknown in the art.

While a specific example has been referred to above, it is to be noted that the novel torque control coupling constituting the invention may be adapted to many applications, by suitable design, such as shaft couplings, screw driver handles, and other uses where the novel structure disclosed may be employed.

It is an object of the invention to provide a novel torque control coupling which, having been set to a particular torque, will accurately and repetitively control this torque irrespective of changes in temperature, humidity, and other conditions which normally deleteriously affect the usual friction couplings.

The invention also consists in the provision of a torque control coupling whose accuracy is not affected by variation in axial load applied to the coupling during the torque controlling operation, and simultaneously embodying a full floating output element to compensate for eccentricity from various causes.

It is also an object of the invention to provide a low mass polar moment of inertia of the output elements to minimize flywheel effects.

Other objects of the invention will be set forth in the following description and drawings which illustrate a preferred embodiment thereof, it being understood that the above statement of objects of the invention is intended generally to explain the same without limiting it in any manner.

Referring now to the following detailed description taken in conjunction with the accompanying drawings, which form a part of this specification, and in which like characters of reference indicate the same or like parts:

Figure 1:
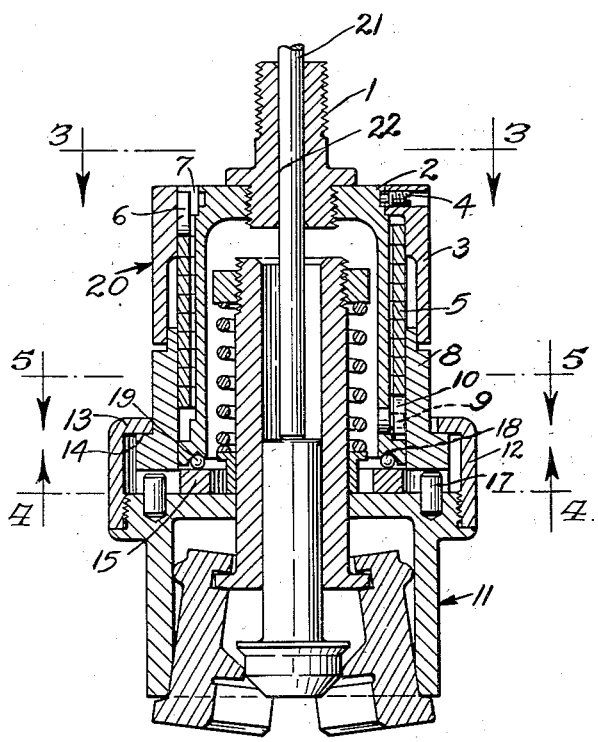
Figure 1 is a sectional view taken along the coupling axis.

Referring to the drawings, and especially to Figure 1, torque is transmitted from a suitable machine spindle (not shown) through adapter 1, which may be formed integrally with inner sleeve 2 or threadably attached thereto, as shown. An upper cylindrical housing 3 is mounted on sleeve 2, and secured from angular movement thereon by set screw 4. A torque sensitive helical clutch spring 5 is located between sleeve 2 which it encircles, and the inner face of cylindrical housing 3. Spring 5 is secured against relative rotation by spring lug 6 formed on one end of clutch spring 5, which engages slot 7 in cylindrical housing 3.

Controlled torque output housing 8 encircles the lower end of sleeve 2. This housing is provided on its upper end with a reduced projection extending upwardly, as viewed in Figure 1, and located between the inner surface of the free end of cylindrical housing 3 and the outer surface of clutch spring 5.

Figure 2:
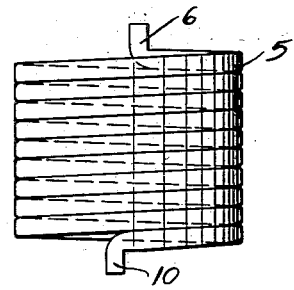
Figure 2 is a side elevation of the torque spring.

The diameter of clutch spring 5 is somewhat greater than the inner diameter of housing 8, such that clutch spring 5 must be reduced in diameter by helical rotary motion in order to effect the assembly of parts, as shown in Figure 1. The lower or free end of sleeve 2 is provided with a lug 9, suitably formed thereon, which is adapted to be engaged by a lug 10 formed on the lower end of clutch spring 5, as shown in Figure 2. The structure described hereinabove may be considered to comprise my novel torque coupling control which is designated generally 20.

In the illustrated embodiment of the invention, a bottle chuck assembly, designated generally 11, which may be of suitable conventional design, is attached by threaded spanner nut 12 to torque control coupling 20. Spanner nut 12 has an inturned upper flange 13 which is turned home against flange 14 on housing 8 when spanner nut 12 is tightened on assembly 11.

Torque transmission is effected from controlled torque output housing 8 to chuck assembly 11 through swash plate 15 and shoulder screws 16 in housing 8, and dowel pins 17 in chuck assembly 11. The lower extremity of sleeve 2 is shaped to form a ball race 18 receiving balls 19 for mutual engagement of balls 19 with race 18 and the top surface of swash plate 15.

Provision is made for stripper rod 21 located in an axial bore 22 in input adapter 1 for suitable release actuation of jaws 23 of chuck assembly 11. As mentioned hereinabove, chuck assembly 11 forms no specific part of the invention, and accordingly detailed description thereof is deemed unnecessary, and is omitted in the interest of brevity.

The operation of the device is as follows: Input torque is transmitted through adapter 1, sleeve 2, housing 3, slot 7 and spring lug 6 to the helical coils of clutch spring 5. This applied torque is in a direction such that the coils of spring 5 are expanded even tighter in housing 8, thus effectively preventing any slippage between clutch spring 5 and housing 8. The resilience of the free coils of spring 5 between sleeve 2 and housing 3 causes relative rotation between sleeve 2 and lug 10 of clutch spring 5. This rotary motion allows lug 9 on sleeve 2 to contact lug 10 on clutch spring 5 within housing 8. After engagement of lug 9 on sleeve 2 with lug 10 on clutch spring 5, further such relative rotation moves lug 10 on spring 5 in a direction with respect to housing 8 which contracts the lower coils of spring 5 located within housing 8. This action permits slippage of spring 5 within housing 8. It is apparent therefore, that the predetermined torque at which slippage will occur is dependent upon the spring constant of clutch spring 5 and the angular phase relationship of lug 9 on sleeve 2, and the lug 10 on clutch spring 5. The spring constant of clutch spring 5 is determined by initial design for a desired range of operating torque. The phase relationship of lugs 9 and 10 is adjusted by relative positioning of sleeve 2 and housing 3, and retained in adjusted position by set screw 4.

Figure 4:
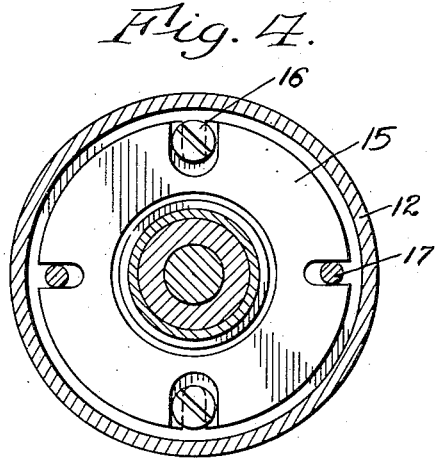
Figure 4 is a view taken on line 4—4 of Figure 1.
Figure 5:
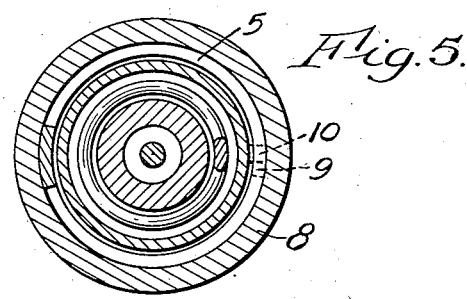
Figure 5 is a view taken on line 5—5 of Figure 1.

As shown in Figures 1 and 4, chuck assembly 11 is provided with a full floating or self-centering action with respect to torque control coupling 20. This is accomplished by providing swash plate 15 with double slots in mutual cooperation with screws 16 and dowel pins 17.

In order that axial thrust may be accommodated by torque control coupling 20 without introducing appreciable and unpredictable frictional torques, ball bearings 19 are located in race 18 formed in the free end of sleeve 2, and run on swash plate 15. It will be apparent that in this arrangement ball race 18 maintains balls 19 in a normal circular configuration at all times for transmission of thrust combined with rotation. The flat top surface of swash plate 15 simultaneously allows lateral movement of swash plate 15 to effect full floating or self-centering of the tool attached to torque control coupling 20. In the illustrated embodiment of the invention the tool is the capping chuck assembly 11.

Figure 3:
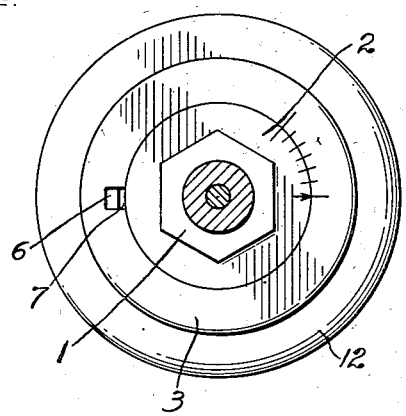
Figure 3 is a view taken on line 3—3 of Figure 1.

Referring to Figure 3, it will be seen that a calibration is on sleeve 2 and housing 3 whereby the predetermined torque to be applied can be adjusted as desired. To vary the torque set screw 4 is loosened to release housing 3 for turning movement on sleeve 2. When housing 3 is turned in a clockwise direction, as viewed in Figure 3, from the position shown, a greater torque is provided for. The desired adjustment having been made, set screw 4 is tightened against sleeve 2, and the device is ready for use. When the adjustment is as shown in Figure 3, the minimum torque will be applied.

The invention above described may be varied in construction within the scope of the claims, for the particular device selected to illustrate the invention is but one of other possible concrete embodiments of the same. The invention is not, therefore, to be restricted to the precise details of the structure shown and described.

What I claim is:

1. A torque control coupling comprising an input torque section, and an output torque housing, said input torque section including two spaced concentric elongated cylindrical members depending from an operating head, a helical clutch spring located in the space between said members, and having its upper end operatively connected to said operating head, means mounting said output torque housing in coaxial alignment with said concentric members, and with the free end of said output torque housing encircled by the free end of the outer of said two concentric cylindrical members, said output torque housing having an inner diameter less than the outer diameter of the lower portion of said helical clutch spring encircled thereby with said portion of said spring tightly resiliently gripping said inner surface of said output torque housing, and means operative in response to the relative rotation of said input torque section and the lower end of said clutch spring in response to the application of a predetermined torque by said input torque section for contracting said spring to cause said spring to release its grip on said inner surface of said output torque housing whereby slippage occurs.

2. The invention defined in claim 1 including means for varying the angular positions of said spaced concentric elongated members, and means for securing said members in a selected adjusted arrangement whereby to adapt said torque control coupling to apply a predetermined torque.

3. A torque control coupling comprising a sleeve provided with a head end and a depending elongated cylindrical section, an outer cylindrical housing having a head attached to said head of said sleeve with the inner surface of said outer cylindrical housing spaced from the outer surface of said depending section of said sleeve, said head of said outer cylindrical housing being provided with a slot, an output torque housing having a reduced annular flange portion seated against the lower free end of said outer cylindrical housing, a helical clutch spring partly located in the space between said outer cylindrical housing and said cylindrical section of said sleeve, a lug formed on the upper free end of said clutch spring engaging in said slot in said outer cylindrical housing, said clutch spring having its lower portion located in the space between the outer surface of said cylindrical section of said sleeve and the inner surface of said output torque housing, said last-named portion of said clutch spring normally tightly engaging and gripping said inner surface of said output torque housing, a torque input driving member attached to said head of said sleeve, an abutment carried on the outer surface of said cylindrical section of said sleeve and located adjacent the free end thereof, an abutment formed on the lower end of said clutch spring and adapted to move into engagement with said abutment on said section of said sleeve when a predetermined torque is applied to said coupling, whereby when said torque is applied, said clutch spring is contracted and the grip between said clutch spring and said output torque housing is released and slippage occurs.

4. A torque control coupling comprising a torque input member provided with a head and an integral depending elongated sleeve section, an outer cylindrical housing having a head attached to said head of said input torque member with the inner surface of said outer cylindrical housing spaced from the outer surface of said sleeve section of said member, said head of said cylindrical housing being provided with an opening therethrough, a helical clutch spring having its upper portion located in the space between the outer surface of said sleeve section and the inner surface of said outer cylindrical housing, said clutch spring having a lug formed on its upper free end extending into said opening, an output torque housing having an inner diameter less than the outer diameter of said helical clutch spring and concentric with said sleeve section and spaced therefrom, the lower end of said clutch spring being located in the space between said inner surface of said output torque housing and the outer surface of said sleeve section, and maintaining a firm resilient grip on said inner surface of said output torque housing, an abutment carried on the free end of said sleeve section, a lug formed on the lower free end of said helical clutch spring, said lug on said spring being adapted in response to the application of a predetermined torque by said input torque member to move into engagement with said abutment on said sleeve section, whereby the lower portion of said clutch spring is contracted to release its grip on said inner surface of said output torque housing and slippage occurs.

5. The invention defined in claim 1, including a ball race formed in the free end of the inner of said concentric members, a plurality of balls located in said race, a swash plate located adjacent the lower free end of said inner concentric member and having an upper surface on which said balls roll, a torque applying tool loosely coupled to said swash plate, and means securing said swash plate and tool in assembled operative relationship, whereby said tool is mounted for full floating and self-centering action relative to said torque control coupling.

6. The invention defined in claim 3, wherein the free end of said depending section of said sleeve is provided with a ball race, a swash plate located adjacent said free end of said depending section of said sleeve, a plurality of balls filling said race and adapted to roll on the upper surface of said swash plate, a torque applying tool, and means coupling said tool to said output torque housing whereby in response to the application of eccentric forces said tool is automatically self-centered with respect to work to which torque is applied.

7. The invention defined in claim 6 wherein said outer cylindrical housing is mounted for angular movement on said head of said sleeve, and means for adjusting the angular relationship of said outer cylindrical housing relative to said sleeve to vary the torque to be applied by said torque control coupling.

References Cited in the file of this patent

UNITED STATES PATENTS

| | | |
|---|---|---|
| 528,614 | Shaw | Nov. 6, 1894 |
| 2,463,083 | Brownlee | Mar. 1, 1949 |

FOREIGN PATENTS

| | | |
|---|---|---|
| 604,883 | France | May 15, 1926 |